3,436,982
TRANSMISSION LINKAGE ADJUSTOR
James J. Jirik, Saginaw, Mich., assignor to General Motors Corporation, Detroit, Mich., a corporation of Delaware
Filed May 16, 1967, Ser. No. 638,954
Int. Cl. G05g 11/00
U.S. Cl. 74—484   6 Claims

ABSTRACT OF THE DISCLOSURE

A transmission control linkage having two controlled levers, with a predetermined clearance between them, and a single adjustment member for setting the clearance. The adjustment member surrounds a portion of a support column and has an inclined slot through which a fastner is inserted to secure the adjustment member to the support column. One of the controlled levers bears against the adjustment member so that, if the fastener is loosened and the adjustment member is rotated, the controlled lever and the adjustment member, due to the inclined slot, are adjusted relative to the other controlled lever to establish the desired clearance.

---

This invention relates to a control linkage and more particularly to the adjustment of a transmission control linkage mounted on a steering column. This type of linkage generally has two controlled levers having a predetermined clearance between them. This invention contemplates the use of a single rotatable member to establish the predetermined clearance and axial location of both levers.

In transmission linkage controls mounted on the steering column assembly, the manual shift control lever, located below the steering wheel, is pivotally mounted in a housing to reciprocate a control tube which is concentric to a stationary tubular support column. The manual lever also rotates the housing and the control tube. The control tube has a clutch lever fixed to its lower end. The clutch lever selectively engages controlled levers that are rotatably mounted on the control tube and support column, when the control tube is reciprocated. Rotation of the control tube causes the controlled lever engaged with the clutch lever to rotate. The controlled levers must be spaced so that the clutch lever engages only one controlled lever when the control tube is being rotated. Due to the manufacturing tolerances for the components in the linkage assembly, some adjustment must be made at assembly to provide proper clearance and alignment of parts. Generally two adjustments are necessary, one adjustment sets the upper limit of the controlled levers while another adjustment sets the clearance between the levers. The present invention uses one set of adjusting screws to control both adjustments.

An object of this invention is to provide a single adjustment member to control the position of and clearance between the control links of a change-gear transmission.

This and other objects of the invention will be more apparent from the following description and drawing of the preferred embodiment.

Figure 1:
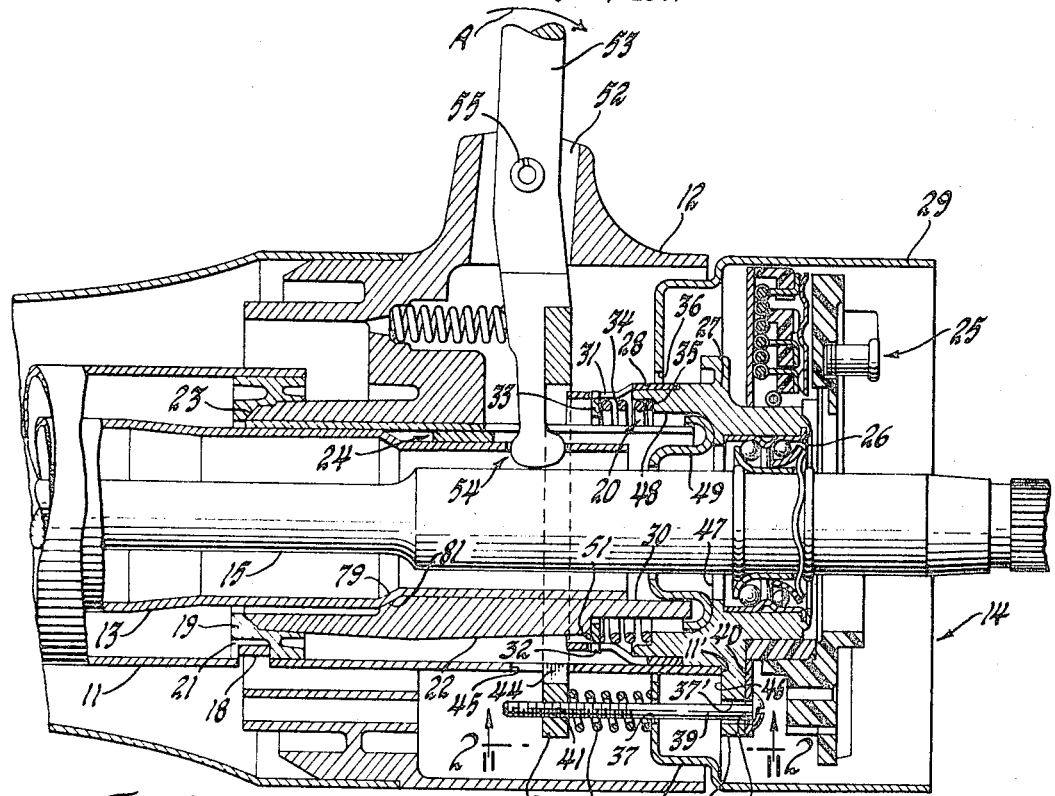
FIGURE 1 is an elevational view in section showing the upper end of the shift linkage and steering column assembly.

The invention is illustrated in a steering column assembly having a support column 11, a housing 12, a control tube 13, a cap assembly or cover shown generally at 14, and a steer shaft 15. The support column 11 is generally tubular in shape and encloses the steer shaft 15 and the control tube 13. Near the upper end of the support column 11 are a plurality of indentations 18 in the support column 11 which axially support a bearing 19 having a plurality of scalloped recessed portions 21 to match the indentations 18. The bearing is radially supported by the inside diameter of the support column.

The housing 12 has a sleeve portion 22 concentric to the support column 11, and having a lower end 23 frustroconical in shape and contacting the bearing 19 which affords radial and axial support to the sleeve portion 22. The control tube 13 is concentric to the sleeve portion 22 and contacts a portion of the inside diameter 30 thereof so that the control tube 13 is slidably supported. The housing 12 and the control tube 13 are in driving relation through a key and keyway shown generally at 24 to permit relative axial movement between the members, but prevent relative rotary movement between them.

The cap assembly 14 includes a turn signal mechanism shown generally at 25, a turn signal shroud 29, a bearing housing assembly or cap assembly shown generally at 20, and a bearing 26 which supports the steer shaft 15. The bearing housing assembly 20 is comprised of a bearing housing or cap member 27, generally cylindrical in shape, a shell 28, a thrust washer 33 and a force storing compressible member, such as a coil spring, 34. The shell 28 has a plurality of slots 31 which receive radially extended tangs 32 of the thrust washer 33. The coil spring 34 is placed between the thrust washer 33 and a spring seat 35 on the bearing housing 27 so that, when the shell 28 is pressed on an outside diameter of the bearing housing 27, the spring 34 is held in compression therebetween. The bearing housing has a plurality of flanged portions 27' having apertures 37' and the turn signal mechanism has a base plate 40 having a plurality of apertures 37''. The turn signal shroud 29 is cup shaped having a large aperture 36 and a plurality of smaller apertures 37 spaced between the large aperture 36 and a side wall 38. Fasteners 39 extend through the apertures 37, 37' and 37'', which are axially aligned, and engage threaded holes 41 in a collar or lock ring 42. The fasteners 39 are each surrounded by a coil spring 43 slightly compressed to maintain a spaced relationship between the lock ring 42 and the turn signal shroud 29 during assembly. The collar 42 is annular in shape and has a projection 44 extending radially inward from its inside diameter which engages a slot 45 in the support column 11. When the fasteners 39 are drawn tight the upper end 11' of the support column 11 abuts a shoulder portion or abutment 46 of the cap member 27, thereby securing the support column 11 to the cap assembly 14.

Figure 2:
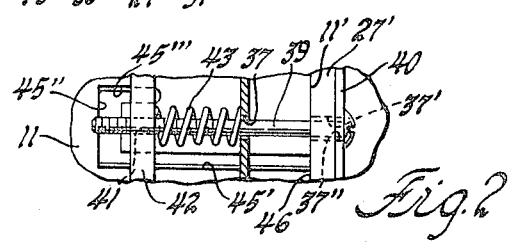
FIGURE 2 is a plan view taken along the line 2—2 in FIGURE 1.

The slot 45, as seen in FIGURE 2, is generally of a J-shape configuration having an upstanding open leg 45', a circumferential portion 45'' and an upstanding closed leg 45'''. The upstanding leg 45' is open at the upper end 11' of the support column 11. The cap assembly 14 is attached to the support column by aligning the projection 44 of the collar 42 with the upstanding leg 45' of slot 45, moving the cap assembly 14 downward until the projection 44 is aligned with the circumferential portion 45", rotating the cap assembly 14 until the projection 44 is aligned with the upstanding leg 45"'. With the cap assembly 14 in this position, the fasteners 39 can be tightened drawing the collar 42 upward, or to the right as viewed in FIGURE 1, so that the projection 44 will contact the end of the upstanding closed leg 45"", thereby drawing the cap assembly 14 onto the support column 11 until the upper end 40 of the support column 11 abuts the shoulder portion 46 of cap 27.

The cap member 27 has an abutment 47 that serves as a stop to locate a bearing 49 which is pressed in the inside diameter 48. The bearing 49 radially supports the housing 12 through contact with the inside diameter 30 of the sleeve portion 22. The sleeve portion 22 has a shoulder 51 which contacts the thrust washer 33 and causes the coil spring 34 to be further compressed. The force exerted by the coil spring 34 holds the housing 12 in contact with the bearing 19 and prevents axial movement of the housing relative to the support column 11.

The housing 12 has an aperture 52 through which extends a manual shift lever 53. The lever 53 is pivotally connected to the housing 12 with a pin 55 and to the control tube 13 with a ball and socket type joint 54. When the lever 53 is pivoted on the pin 55, the control tube 13 reciprocates relative to the support column 11 and the housing 12. When the lever 53 is rotated, the control tube 13 and the housing 12 are rotated relative to the support column 11.

Figure 3:
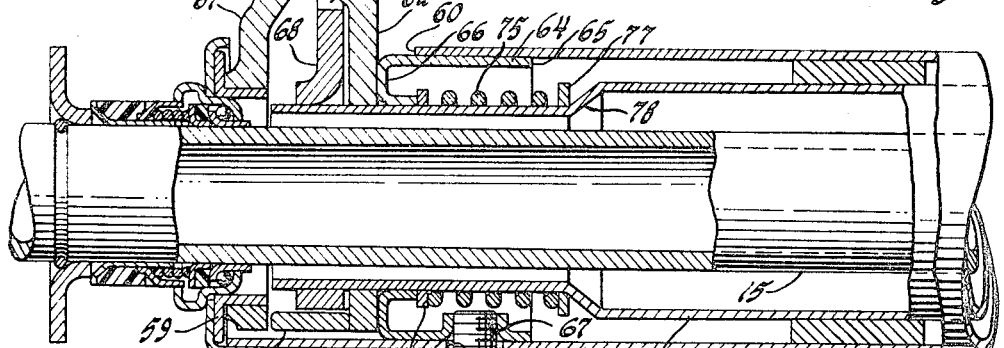
FIGURE 3 is an elevational view in section showing the lower end of the shift linkage and steering column assembly.

The support column 11, as seen in FIGURE 3 has a plurality of apertures 56 spaced about the circumference near the lower end. A sleeve member 57, open on one side, contacts the outside diameter of the support column 11 and extends upward beyond the apertures 56. The sleeve 57 has angled slots 58 which are aligned with the apertures 56. The bottom of the sleeve 57 is turned inward and has a bearing 59 welded thereto. A lower controlled lever 61 is rotatably and axially supported by the bearing 59 and extends radially outward from the bearing 59 through the open side of said sleeve 57 and an opening 60 at the lower end of the support column 11. An upper controlled lever 62 is rotatably mounted on the control tube 13 and extends radially outward from the control tube 13 through the open side of the sleeve 57 and the opening 60. A spacer is located between the upper and lower controlled lever to maintain a minimum clearance between them. The spacer 63 extends around a portion of the circumference of the control tube 13. The upper controlled lever 62 is in contact with a bearing 64 which is radially supported by the support column 11. The bearing 64 is cylindrical on its upper portion 65 and has a U-shaped cross section on its lower portion 66. The upper portion 65 of the bearing 64 has a plurality of threaded apertures, spaced about its circumference, which are aligned with the apertures 56 on the support column 11. A controlling or clutch lever 68 is welded to the lower end of the control tube 13. The controlling lever 68 extends radially outward, in a plane parallel to the controlled levers 61 and 62, from the control tube 13 through the open side of the sleeve member 57 and the opening 60. The controlling lever 68 has a slotted portion 69 on its extended end 71. The controlling lever 68 is reciprocated with the control tube 13 thereby permitting the slotted portion 69 of the controlling lever 68 to engage either a projection 72 on the upper controlled lever 62 or a projection 73 on the lower controlled lever 61. Rotation of the control tube 13 and the controlling lever 68 cause the controlled lever so engaged to rotate. The controlled levers 61 and 62 are connected, through linkages not shown, to the shift forks of a change-gear transmission, not shown.

To ensure proper clearance between the upper controlled lever 62 and the lower controlled lever 61, a plurality of fasteners 74 are inserted through the aperture 56 and the slot 58 and threaded into the aperture 67. The aperture 56 is sufficiently larger than the fastener 74 to permit some axial adjustment thereby setting the upper position of controlled lever 62. The sleeve 57 can be rotated and, due to the angular slots 58, the fasteners 74 affixed in bearing 64 to move bearing 64, upper controlled lever 62, the controlling lever 68, and the control tube 13 axially relative to lower controlled lever 61, thereby obtaining the proper clearance between the controlled levers 61 and 62. When the proper clearance is obtained, the fasteners 74 are tightened to hold the members in the relationship thus established. A coil spring 75, coiled about the control tube 13, contacts a thrust washer 76 on its lower end and a thrust washer 77 on its upper end. The thrust washer 76 abuts the bearing 64 and the thrust washer 77 abuts an abutment portion 78 of the control tube 13. During the establishment of the proper clearance between the controlled levers 61 and 62, the compressed spring 75 forces the control tube 13 in the upward position shown. The upward position of the control tube is established by contact between upper controlled lever 62 and controlling lever 68 which was established when proper clearance was obtained between the controlled levers 61 and 62.

The shift pattern of the manual lever is generally H-shaped, as is conventional in this type of transmission. The second and third gear shift positions being on one upright leg of the H and low and reverse gear shift positions being on the other upright leg of the H. The crossbar of the H is the neutral position. The control tube 13 and manual lever 53 are biased, by spring 75, in the second and third gear shift position. Hence a shift to second or third gear can be made merely by rotating the manual lever 53 counterclockwise or clockwise as viewed from the upper or steering wheel end of the steering column assembly. Rotation of the manual lever 53 causes control tube 13, controlling lever 68, and controlled lever 62 to rotate thus establishing the desired gear position. To effect a shift to low or reverse, the manual lever 53 must be pivoted in the direction of arrow A. This movement causes control tube 13 and controlling lever 68 to move downward, thereby disengaging slot 69 from projection 72 and engaging slot 69 with projection 73. Rotation of the manual lever 53 causes controlled lever 61 to rotate thus establishing the desired gear position. To change from low or reverse to second or third, the manual lever 53 must be moved through the neutral position. Once a gear position other than neutral has been established, the controlling lever 68 cannot come out of engagement with the respective controlled lever because the unslotted portion of the extended end 71 has sufficient width so that it will contact the projection of the unshifted controlled lever.

I wish it to be understood that I do not desire to be limited to the exact details of construction shown and described, for obvious modifications will occur to a person skilled in the art.

What is claimed is:

1. In a control linkage, controlling means including a tubular support column and a control tube concentric to said support column and being operable to reciprocate and rotate relative thereto, means for operating said control tube, shift means including a clutch lever fixed to said control tube and at least two controlled levers rotatably mounted on said controlling means operative for selectively positioning a shift linkage of a change-gear transmission and adjusting means including a single rotatable sleeve operatively connected to said support column circumjacent the outer surface and enclosing the lower end thereof for positioning said controlled levers relative to said clutch levers of said shift means.

2. The invention defined in claim 1 and one of said controlled levers being rotatably and axially supported by a bearing on said rotatable sleeve, another of said controlled levers being rotatably mounted on said control tube, said clutch lever being secured to said control tube spaced between said controlled levers and having a slotted portion, and a projection on each of said controlled levers selectively engageable by said slotted portion, and said adjusting means including a spacer between said controlled levers, and a bearing means secured by a fastener to said support column and axially supporting said controlled lever mounted on said control tube.

3. The invention defined in claim 2 and said adjusting means including an aperture in said support column and an angled slot in said sleeve aligned with said aperture, said fastener extending through said aperture and said angled slot thereby establishing a spacial relation between the controlled levers when the fastener is tightened, and said spacial relation being adjustable upon loosening of said fastener and rotation of said sleeve.

4. In a control linkage, a support column, a housing rotatable relative to said support column and having a portion concentric thereto, bearing means on said support column rotatably and axially supporting said housing, a control tube concentric to and rotatable relative to said support column and axially moveable relative to both the support column and the housing, said control tube being radially supported by said housing, a first controlled lever rotatably supported on said control tube having a protruding portion, an adjustable sleeve member radially supported on said support column, a second controlled lever rotatably supported by said adjustable sleeve member and having a protruding portion, a clutch lever fixed to said control tube having a slotted portion, means including said adjustable sleeve member for adjusting said first and second controlled levers to obtain a clearance between their respective protruding portions, and means for manually moving said control tube axially and rotatably to select engagement between the slotted portion on the clutch lever and the protruding portion on one of said first and second controlled levers and rotating said controlled lever so engaged upon rotary movement of said control tube.

5. The invention described in claim 4 and said means for adjusting said first and second control levers including said adjustable sleeve member having a cylindrical body portion having an angled slot in contact with said support column and a bearing portion rotatably and axially supporting said second controlled lever, a bearing member axially supporting said first controlled lever and having a threaded aperture in a cylindrical portion in contact with the support column, a spacer, and a fastener, said support column having an aperture, said fastener extending through said angled slot and said aperture and engaging said threaded aperture, said spacer being located between said first and second controlled levers to establish a minimum clearance therebetween, whereby said adjustable sleeve may be rotated when said fastener is loose to establish maximum clearance between said first and second controlled levers and will be held from rotation when said fastener is tight.

6. In a control linkage a tubular support column having an opening at the lower end thereof, a control tube concentric to said support column and being operable to reciprocate and rotate relative thereto, a housing having a portion concentric to said support column and being operable to rotate relative thereto, means for operating said control tube and housing, means for preventing relative axial movement between said support column and said housing, a cylindrical sleeve open on one side adjacent said opening in said support column and being in contact with said support column, a first bearing member secured to said sleeve, a first controlled lever rotatably supported on said first bearing member and extending radially therefrom through said open side of said sleeve, a second controlled lever rotatably supported on said control tube and extending radially therefrom through said open side of said sleeve, a second bearing member axially supporting said second controlled lever and being in contact with said support tube, a clutch lever secured to said control tube and extending radially therefrom through said open side of said sleeve, shift means including said clutch lever for selectively engaging one of said first and second controlled levers upon reciprocation of said control tube and rotating said engaged controlled lever upon rotation of said control tube, and means including said sleeve for insuring proper clearance between said first and second controlled levers so that only one of said first and second controlled levers will be engaged by said shift means.

References Cited

UNITED STATES PATENTS 3,025,714 3/1962 Bliss _____ 74—484
3,025,715 3/1962 Grady _____ 74—484

MILTON KAUFMAN, *Primary Examiner.*